(12) United States Patent
Abergil et al.

(10) Patent No.: US 12,673,464 B2
(45) Date of Patent: Jul. 7, 2026

(54) EQUIPMENT AND METHODS FOR FUSED DEPOSITION MODELING 3D PRINTING

(71) Applicant: A.M.M—NEXT DIMENSION MANUFACTURING LTD., Hof Ashkelon (IL)

(72) Inventors: Meir Abergil, Ashdod (IL); Arye Katz, Nechusha (IL)

(73) Assignee: A.M.M—NEXT DIMENSION MANUFACTURING LTD., Hof Ashkelon (IL)

( * ) Notice: Subject to any disclaimer, the term of this patent is extended or adjusted under 35 U.S.C. 154(b) by 80 days.

(21) Appl. No.: 18/255,613

(22) PCT Filed: Dec. 1, 2021

(86) PCT No.: PCT/IL2021/051427
§ 371 (c)(1),
(2) Date: Jun. 2, 2023

(87) PCT Pub. No.: WO2022/118311
PCT Pub. Date: Jun. 9, 2022

(65) Prior Publication Data
US 2024/0001615 A1      Jan. 4, 2024

(30) Foreign Application Priority Data

Dec. 3, 2020      (IL) .......................................... 279175

(51) Int. Cl.
B29C 64/118 (2017.01)
B29C 64/209 (2017.01)
(Continued)

(52) U.S. Cl.
CPC .......... B29C 64/336 (2017.08); B29C 64/118 (2017.08); B29C 64/209 (2017.08);
(Continued)

(58) Field of Classification Search
CPC ... B29C 64/209; B29C 64/336; B29C 64/118; B29C 48/0013; B33Y 10/00
See application file for complete search history.

(56) References Cited

U.S. PATENT DOCUMENTS 1,030,796 A      6/1912  Turner
9,669,586 B2      6/2017  Page
(Continued)

FOREIGN PATENT DOCUMENTS

CN      104827670      8/2015
EP       2990709      3/2016
KR      20200044214      4/2020

OTHER PUBLICATIONS

Alex Beaudoin, Robert Boulanger, Jessica DiPersio, Multihead3DPrinter , 2016 (Year: 2016).*
(Continued)

*Primary Examiner* — Alison L Hindenlang
*Assistant Examiner* — Debjani Roy
(74) *Attorney, Agent, or Firm* — ISUS INTELLECTUAL PROPERTY PLLC; Anthony Jason Mirabito

(57)      ABSTRACT

A 3D printer comprising: (a) a feed mechanism comprising a push motor adapted to push a solid filament through a feed conduit; and (b) a print head comprising a pull motor adapted to pull said filament from said conduit and direct said filament to a heating block in fluid communication with a print nozzle.

10 Claims, 12 Drawing Sheets

(51) Int. Cl.
| | |
|---|---|
| *B29C 64/336* | (2017.01) |
| *B29C 64/393* | (2017.01) |
| *B33Y 10/00* | (2015.01) |
| *B33Y 30/00* | (2015.01) |
| *B33Y 50/02* | (2015.01) |

(52) U.S. Cl.
CPC ............. *B29C 64/393* (2017.08); *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 10,005,126 B2 | 6/2018 | Page | |
| 10,065,373 B2 | 9/2018 | Iorio et al. | |
| 10,456,992 B2 | 10/2019 | Fontaine | |
| 10,654,220 B2 | 5/2020 | Iorio et al. | |
| 2015/0093465 A1* | 4/2015 | Page | B33Y 10/00 |
| | | | 425/132 |
| 2015/0375451 A1 | 12/2015 | Voris et al. | |
| 2016/0067920 A1* | 3/2016 | Fontaine | B29C 64/106 |
| | | | 264/255 |
| 2016/0342150 A1 | 11/2016 | Yulin et al. | |
| 2018/0002134 A1* | 1/2018 | Rubens | B29C 64/321 |
| 2018/0304530 A1* | 10/2018 | Nadvornik | B29C 64/209 |
| 2019/0315114 A1* | 10/2019 | Hjelsand | B29C 48/05 |
| 2020/0282651 A1 | 9/2020 | Chu et al. | |
| 2023/0012165 A1* | 1/2023 | Luo | B29C 64/245 |

OTHER PUBLICATIONS

International Search Report of PCT/IL2021/051427, dated Mar. 14, 2022.

Written Opinion of the International Searching Authority of PCT/IL2021/051427, dated Mar. 14, 2022.

International Preliminary Report on Patentability of PCT/IL2021/051427, dated May 30, 2023.

* cited by examiner

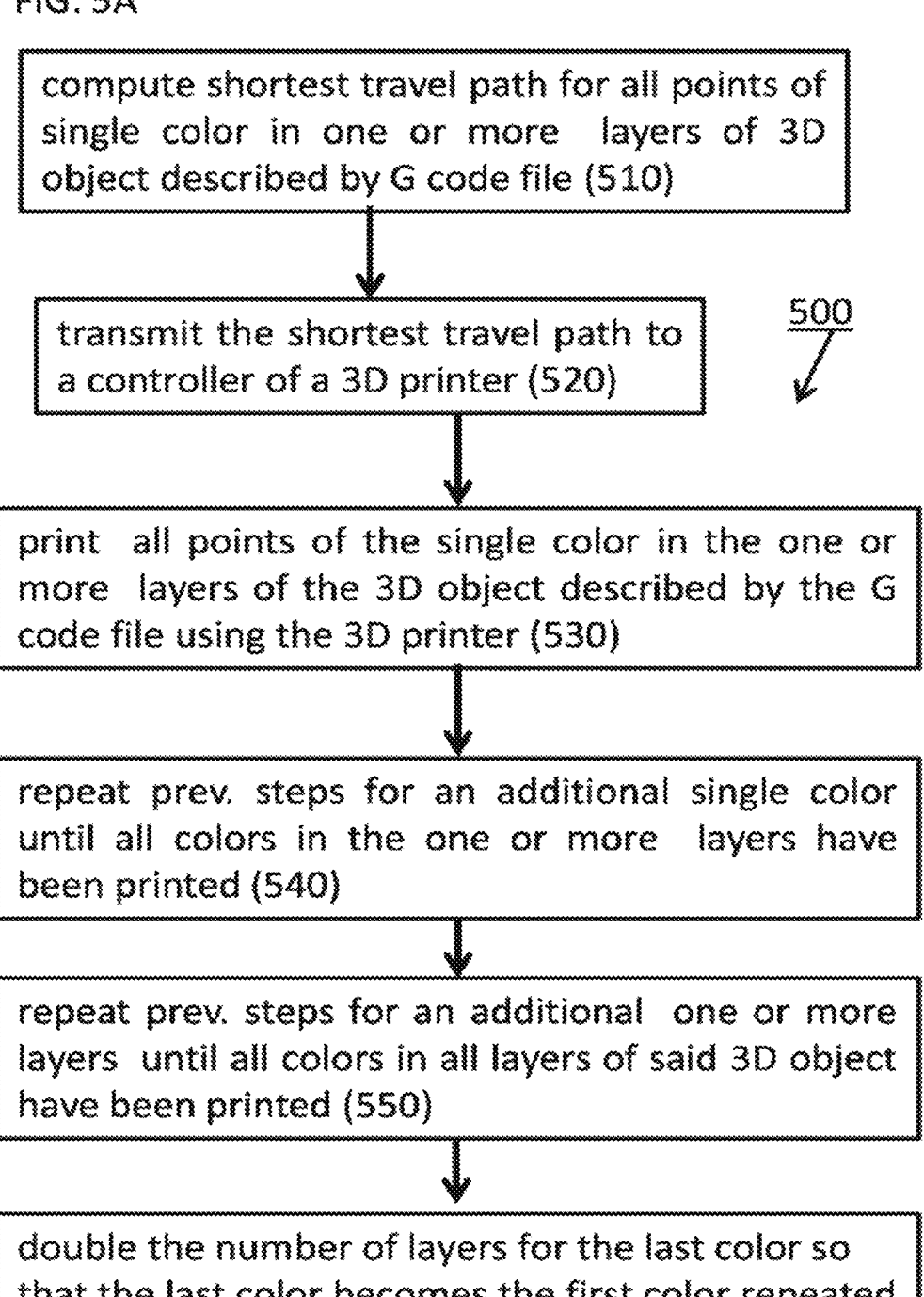

compute shortest travel path for all points of single color in one or more layers of 3D object described by G code file (510)

transmit the shortest travel path to a controller of a 3D printer (520)

500 print all points of the single color in the one or more layers of the 3D object described by the G code file using the 3D printer (530)

repeat prev. steps for an additional single color until all colors in the one or more layers have been printed (540)

repeat prev. steps for an additional one or more layers until all colors in all layers of said 3D object have been printed (550)

double the number of layers for the last color so that the last color becomes the first color repeated at 550 (560)

EQUIPMENT AND METHODS FOR FUSED DEPOSITION MODELING 3D PRINTING

CROSS-REFERENCE TO RELATED APPLICATIONS

This application is a National Phase of International Application Number PCT/IL2021/051427, filed Dec. 1, 2021, which claims priority to and the benefit of Israeli Application 279175, filed Dec. 3, 2020, according to 35 U.S.C. § 119 (a). The disclosures of the aforementioned priority applications are incorporated herein by reference in their entireties.

FIELD OF THE INVENTION

The invention is in the field of 3D printing

BACKGROUND OF THE INVENTION

There are three main types of 3D printing (also known as additive manufacturing): stereolithography (SLA); selective laser sintering (SLS) and fused deposition modeling (FDM). Although FDM was invented last it has become the leading method of 3D printing, accounting for 46% of the 3D printing market as of 2018. FDM is also referred to as Fused Filament Fabrication (FFF).

FDM employs a continuous filament (typically thermoplastic polymer but sometimes metal) fed from a spool to a moving extruder which serves as a print head. The extruder includes a heating element to soften the filament to facilitate extrusion through a nozzle. Drops of softened filament are successively deposited at desired locations under the control of a computerized controller operating mechanical elements that move the print head relative to a work surface (or the work surface relative to the print head). Upon completion of one layer, the controller moves the print head up (or the work surface down) by a small increment and provides instructions for deposition of a next layer on the previous layer, giving rise to the term additive manufacturing.

The initial input for the computerized controller is typically an STL file (stereolithography file format) file generated by a CAD program. STL stores data based on triangulations of the surface of CAD models. Additive Manufacturing File format (AMF) is a newer CAD file format more suitable for 3D printing which stores information using curved triangulations.

Typically an STL file is processed by "slicer" software to convert the model into a series of thin layers. The slicer software outputs a G-code file containing instructions tailored to FDM printers. G code serves as the input for 3D printing client software (used by the controller to instruct the print head during the printing process).

Printer resolution describes layer thickness and X-Y resolution in dots per inch (dpi) or micrometers (μm). Typical layer thickness is in the range of 100 μm (250 DPI) to 16 μm (1,600 DPI). X-Y resolution is as good as that of laser printers. The particles (3D dots) are around 50 to 100 μm (510 to 250 DPI) in diameter. For that printer resolution, specifying a mesh resolution of 0.01-0.03 mm and a chord length ≤0.016 mm generate an optimal STL output file for a given model input file.

SUMMARY OF THE INVENTION

A broad aspect of the invention relates to improvements in speed and resolution of 3D printing. In some embodiments multicolor printing is achieved in the same time, or less time, than monochrome printing using previously available equipment.

One aspect of some embodiments of the invention relates to coordinated operation of a "push" motor remote from a print head in conjunction with a "pull" motor adjacent to the print head. In some embodiments, multiple "push" motors are employed for different filament colors. According to various exemplary embodiments of the invention 2, 3, 4, 5, 6, or more push motors are employed for a corresponding number of colors and/or different material. According to these embodiments, a splitter is deployed between the multiple "push" motors and the "pull" motor. Alternatively or additionally, in some embodiments the "pull motor" is equipped with a variable tensioning mechanism that allows adjustment of pull force in accord with a filament being pulled at any given moment. In some embodiments, the variable tensioning mechanism is subject to control of a computerized controller. In some embodiments, this controller is integrated with a controller performing other functions. In some exemplary embodiments of the invention, the controller is responsive to an output signal from a sensor in the pull motor indicating the current of the pull motor. According to various exemplary embodiments of the invention, a distance between a push motor and the pull motor is less than 50 cm, less than 45 cm, less than 40 cm, less than 35 cm, less than 30 cm, less than 25 cm, less than 20 cm, less than 15 cm or intermediate or lesser distances. Alternatively or additionally, in some embodiments a distance between a push motor and the pull motor is greater than 15 cm, greater than 20 cm, greater than 25 cm, greater than 30 cm, greater than 35 cm, greater than 40 cm, greater than 45 cm, greater than 50 cm or intermediate or greater distances. In some exemplary embodiments of the invention, in the range of 30 cm to 42 cm, 33 cm to 39 cm, or 35 to 37 cm. In some exemplary embodiments of the invention, 2, 3, 4 or more push to fit connectors arranged in series hold a conduit through which the filament is pushed to a feed port. In some embodiments increasing the number of connectors contributes to an increase in the possible distance between "push" and "pull" motors.

Another aspect of some embodiments of the invention relates to coordinated motion of a filament feed assembly and a print head at a distance from the filament feed assembly. In some embodiments, multiple filament feed assemblies are employed for different filament colors and/or different materials. According to various exemplary embodiments of the invention 2, 3, 4, 5, 6, or more filament feed assemblies are employed for a corresponding number of colors. Alternatively or additionally, in some embodiments the filament feed assembly is vertically offset with respect to the print head. Alternatively or additionally, in some embodiments a single controller coordinates operation of a filament feed assembly drive mechanism and a print head drive mechanism. In some embodiments, the filament feed assembly drive mechanism move the filament fed assembly back and forth along a single axis (e.g. Y-axis). Alternatively or additionally, in some embodiments the print head drive assembly moves the print head in two axes (e.g. X and Y). In some embodiments controller coordinates operation of the filament feed assembly drive mechanism and the print head drive mechanism so that a distance between the filament feed assembly and the printer head is as described in the context of the first aspect.

Another aspect of some embodiments of the invention relates to reducing a total distance traveled by the print head in printing a single layer, or group of layers, of the object.

In some embodiments, a reduction in travel distance contributes to a reduction in printing time. For objects with two or more colors in one layer, the calculation may be performed separately for each color. In some embodiments, a reduction in the number of color change events contributes to a reduction in printing time for the object.

Yet another aspect of some embodiments of the invention relates to installation of an inductive heating element in the print head. In some embodiments use of inductive heating contributes to faster temperature changes which contribute to faster changes in viscosity of the thermoplastic material used as a print media. In some embodiments, these faster changes in viscosity contribute to an increase in printing accuracy.

Still another aspect of some embodiments of the invention relates to parallel printing of multiple identical objects. According to various exemplary embodiments of the invention 2, 3, 4, 5, 6, 7, 8, or more identical objects are printed in parallel in the time it takes to print a single object. In some embodiments, a single controller operates multiple push motors and pull motors (as described in the first aspect) and/or multiple filament feed assembly drive mechanisms and print head drive mechanisms and/or (as described in the second aspect) and/or multiple inductive heating elements (as described in the fourth aspect) in multiple print heads and/or multiple color mixing print heads (as described in the fifth aspect). Alternatively or additionally, in some embodiments, the controller drives the print heads in parallel using a reduced total travel distance and/or reduced number of color changes per layer as described in the third aspect.

It will be appreciated that the various aspects described above relate to solution of technical problems associated with reducing printing time for a given object relative to previously available alternatives.

Alternatively or additionally, it will be appreciated that the various aspects described above relate to the solution of technical problems related to producing 3D printed objects with 3 or more colors.

In some exemplary embodiments of the invention there is provided a 3D printer including: (a) a feed mechanism including a push motor adapted to push a solid filament through a feed conduit; and (b) a print head including a pull motor adapted to pull the filament from the conduit and direct the filament to a heating block in fluid communication with a print nozzle. In some embodiments, the printer includes a controller configured to coordinately operate the push motor, the pull motor, and the print nozzle. Alternatively or additionally, in some embodiments the printer includes two or more feed mechanisms connected by a like number of conduits to the print head. Alternatively or additionally, in some embodiments the printer includes a first support bar upon which the feed mechanism is mounted; and a second support bar upon which the print head is mounted. Alternatively or additionally, in some embodiments the feed mechanism includes two or more push to fit connectors installed in series to lock an end of the feed conduit to an output port in the feed mechanism. Alternatively or additionally, in some embodiments the feed mechanism includes glue adhering an end of the feed conduit to an output port in the feed mechanism.

In some exemplary embodiments of the invention there is provided a 3D printer including: (a) a first support bar upon which one or more feed mechanism(s) is mounted, the first support bar operably connected to a first drive train configured to provide linear motion in 1 axis in 2 directions; (b) a second support bar upon which a print head is mounted, the second support bar operably connected to a second drive train configured to provide linear motion in 1 axis, parallel to the one axis of the first drive, train in 2 directions; and (c) a third drive train configured to provide parallel linear motion of the print head relative to the second bar in 2 directions.

In some embodiments, the printer includes a controller configured to coordinately operate the first drive train, the second drive train, and the third drive train. Alternatively or additionally, in some embodiments the printer includes a fourth drive train configured to provide parallel linear motion of the one or more feed mechanism(s) relative to the first bar in 2 directions. Alternatively or additionally, in some embodiments the printer includes a controller configured to coordinately operate the first drive train, the second drive train, the third drive train, and the fourth drive train. Alternatively or additionally, in some embodiments the printer includes two or more feed mechanisms connected by a like number of conduits to the print head. Alternatively or additionally, in some embodiments the printer includes a controller configured to operate a single feed mechanism at a time in accord with a specified color in a program file of an object being printed. Alternatively or additionally, in some embodiments the feed mechanism includes two or more Groove Mount Bowden Adaptors and/or Festo fittings installed in series to lock an end of a feed conduit to an output port in the feed mechanism.

In some exemplary embodiments of the invention there is provided a method including: (a) computing, using a data processor, a shortest travel path for all points of a single color in one or more layers of a 3D object described by a G code file; (b) transmitting the shortest travel path to a controller of a 3D printer; and (c) printing the all points of a single color in the one or more layers of the 3D object described by a G code file using the 3D printer. In some embodiments, the computing relates to a single layer. Alternatively or additionally, in some embodiments the computing relates to a group of two or more layers. Alternatively or additionally, in some embodiments the method includes (d) repeating (a), (b) and (c) for an additional single color until all colors in the one or more layers have been printed. Alternatively or additionally, in some embodiments the method includes (e) repeating (a),(b), (c) and (d) for an additional one or more layers until all colors in all layers of the 3D object have been printed. Alternatively or additionally, in some embodiments the method includes doubling the number of layers for the last color so that the last color becomes the first color repeated at (e).

In some exemplary embodiments of the invention, there is provided a 3D printer including: an FDM (fused deposition modeling) printing head including an inductive heater to melt material. In some embodiments, melting contributes to an ability of the material to pass through a print nozzle.

In some exemplary embodiments of the invention there is provided a method including: (a) supplying filament to each of n print heads from a corresponding set of n feed mechanisms spaced from the n print heads by at least 10 cm; (b) controlling position and print status of the n print heads with a single controller that provides parallel instructions to each of the n print heads concurrently, and (c) switching to a different corresponding set of n feed mechanisms using the single controller. In some embodiments, the method includes controlling position of all corresponding sets of n feed mechanisms with the single controller that provides parallel instructions to each of the n feed mechanisms in all of the sets concurrently.

In some exemplary embodiments of the invention there is provided a 3D printer including: at least X sets of n filament feed mechanisms operably connected to a first drive train configured to provide linear motion in 1 axis in 2 directions; (b) X print heads operably connected to a second drive train configured to provide linear motion in 1 axis, parallel to the one axis of the first drive, train in 2 directions; and (c) a third drive train configured to provide linear motion of the X print heads in a perpendicular axis in 2 directions; wherein n≥2. In some embodiments the printer includes a controller configured to coordinately operate the first drive train, the second drive train, and the third drive train. Alternatively or additionally, in some embodiments the printer includes a fourth drive train configured to provide linear motion of the X sets of n feed mechanisms in a perpendicular axis in 2 directions. Alternatively or additionally, in some embodiments the printer includes a controller configured to coordinately operate the first drive train, the second drive train, the third drive train, and the fourth drive train. Alternatively or additionally, in some embodiments the controller is configured to operate a single filament feed mechanism in each of the X sets at a time in accord with a specified color in a program file of an object being printed. Alternatively or additionally, in some embodiments the filament feed mechanism includes two or more push to fit connectors installed in series to lock an end of a feed conduit to an output port in the feed mechanism.

In some exemplary embodiments of the invention, there is provided an FDM printing method including: depositing from a single print head with a 0.4 to 0.8 mm diameter nozzle 1000 grams of thermoplastic filament using a filament feed of 1.75 mm diameter in 24 hours. In some embodiments, the method includes printing in at least 2 colors. Alternatively or additionally, in some embodiments the method includes printing in at least 4 colors. Alternatively or additionally, in some embodiments the method includes operating at least two of the single print heads from a single controller. Alternatively or additionally, in some embodiments the method includes operating at least four of the single print heads from a single controller. Alternatively or additionally, in some embodiments the method includes operating at least eight of the single print heads from a single controller.

In some exemplary embodiments of the invention there is provided a connector assembly including: (a) a cowling with an internal cavity; (b) a conduit passing through the cavity; and (c) at least 2 push to fit connectors serially engaging a portion of the conduit and contacting an inner wall of the cavity.

In some exemplary embodiments of the invention, there is provided a connector assembly including: (a) a cowling with an internal cavity; (b) a conduit passing through the cavity; and (c) glue connecting a portion of the conduit to an inner wall of the cavity.

Unless otherwise defined, all technical and scientific terms used herein have the same meaning as commonly understood by one of ordinary skill in the art to which this invention belongs. Although suitable methods and materials are described below, methods and materials similar or equivalent to those described herein can be used in the practice of the present invention. In case of conflict, the patent specification, including definitions, will control. All materials, methods, and examples are illustrative only and are not intended to be limiting.

As used herein, the terms "comprising" and "including" or grammatical variants thereof are to be taken as specifying inclusion of the stated features, integers, actions or components without precluding the addition of one or more additional features, integers, actions, components or groups thereof. This term is broader than, and includes the terms "consisting of" and "consisting essentially of" as defined by the Manual of Patent Examination Procedure of the United States Patent and Trademark Office. Thus, any recitation that an embodiment "includes" or "comprises" a feature is a specific statement that sub embodiments "consist essentially of" and/or "consist of" the recited feature.

The phrase "consisting essentially of" or grammatical variants thereof when used herein are to be taken as specifying the stated features, integers, steps or components but do not preclude the addition of one or more additional features, integers, steps, components or groups thereof but only if the additional features, integers, steps, components or groups thereof do not materially alter the basic and novel characteristics of the claimed composition, device or method.

The phrase "adapted to" as used in this specification and the accompanying claims imposes additional structural limitations on a previously recited component.

The term "method" refers to manners, means, techniques and procedures for accomplishing a given task including, but not limited to, those manners, means, techniques and procedures either known to, or readily developed from known manners, means, techniques and procedures by practitioners of architecture and/or computer science.

Implementation of the method and system according to embodiments of the invention involves performing or completing selected tasks or steps manually, automatically, or a combination thereof. Moreover, according to actual instrumentation and equipment of exemplary embodiments of methods, apparatus and systems of the invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

In order to understand the invention and to see how it may be carried out in practice, embodiments will now be described, by way of non-limiting example only, with reference to the accompanying figures. In the figures, identical and similar structures, elements or parts thereof that appear in more than one figure are generally labeled with the same or similar references in the figures in which they appear. Dimensions of components and features shown in the figures are chosen primarily for convenience and clarity of presentation and are not necessarily to scale. The attached figures are:

FIG. 5A is a simplified flow diagram of a method according to some exemplary embodiments of the invention;

DETAILED DESCRIPTION OF EMBODIMENTS

Embodiments of the invention relate to 3D printers and related methods as well as to extruders and methods for producing filaments for use in 3D printing.

Specifically, some embodiments of the invention can be used to increase speed and/or resolution of 3D printing and/or increase the number of colors in a 3D printed object to 3 or more colors and/or 3 or more filament types.

The principles and operation of devices and/or methods according to exemplary embodiments of the invention may be better understood with reference to the drawings and accompanying descriptions.

Before explaining at least one embodiment of the invention in detail, it is to be understood that the invention is not limited in its application to the details set forth in the following description or exemplified by the Examples. The invention is capable of other embodiments or of being practiced or carried out in various ways. Also, it is to be understood that the phraseology and terminology employed herein is for the purpose of description and should not be regarded as limiting.

Exemplary Printer

Figure 1:
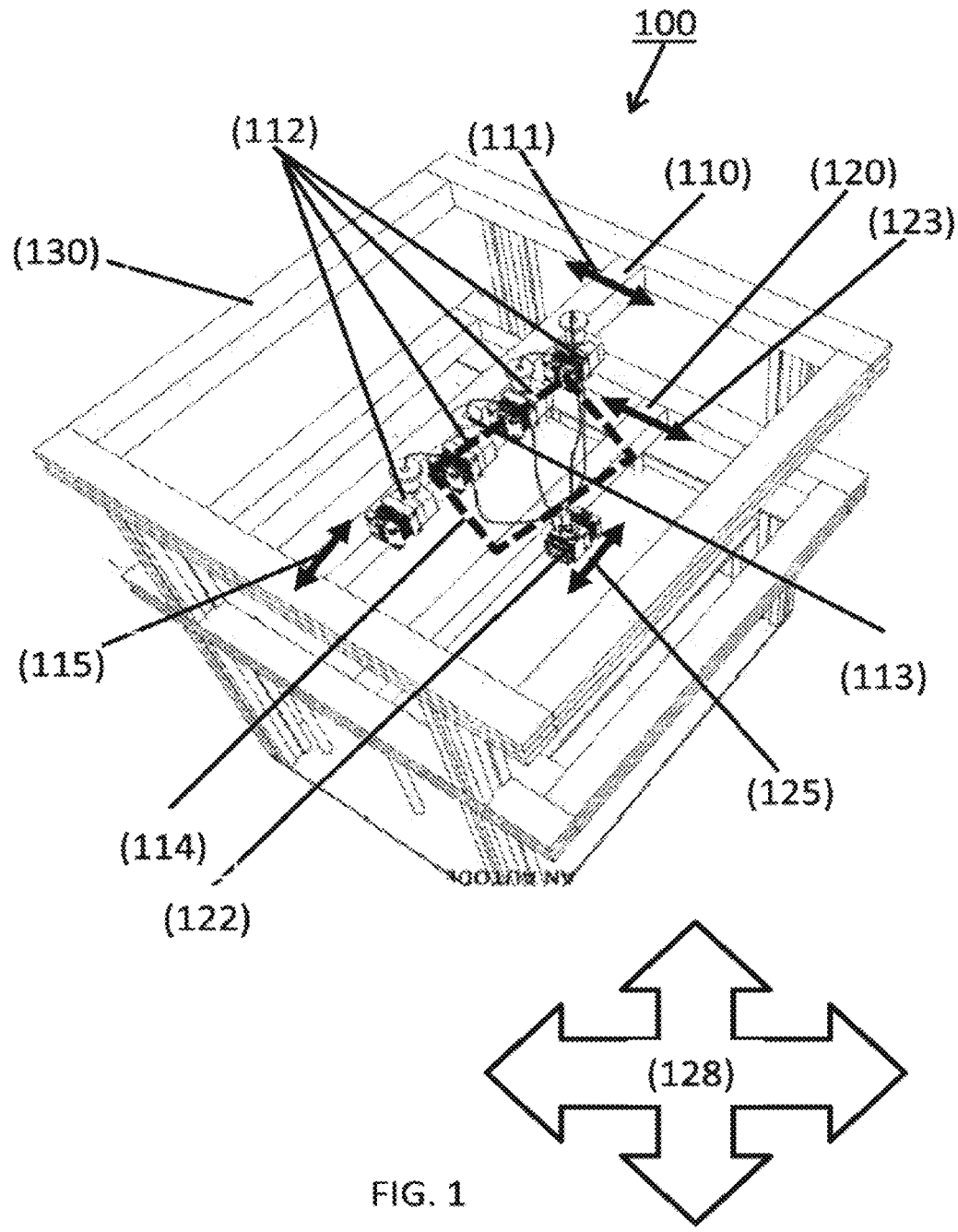
FIG. 1 is a schematic top perspective view of a system according to some exemplary embodiments of the invention.

FIG. 1 is a schematic top perspective view of a 3D printing system, indicated generally as 100, according to some exemplary embodiments of the invention.

Figures 2A, 2B, 2E:
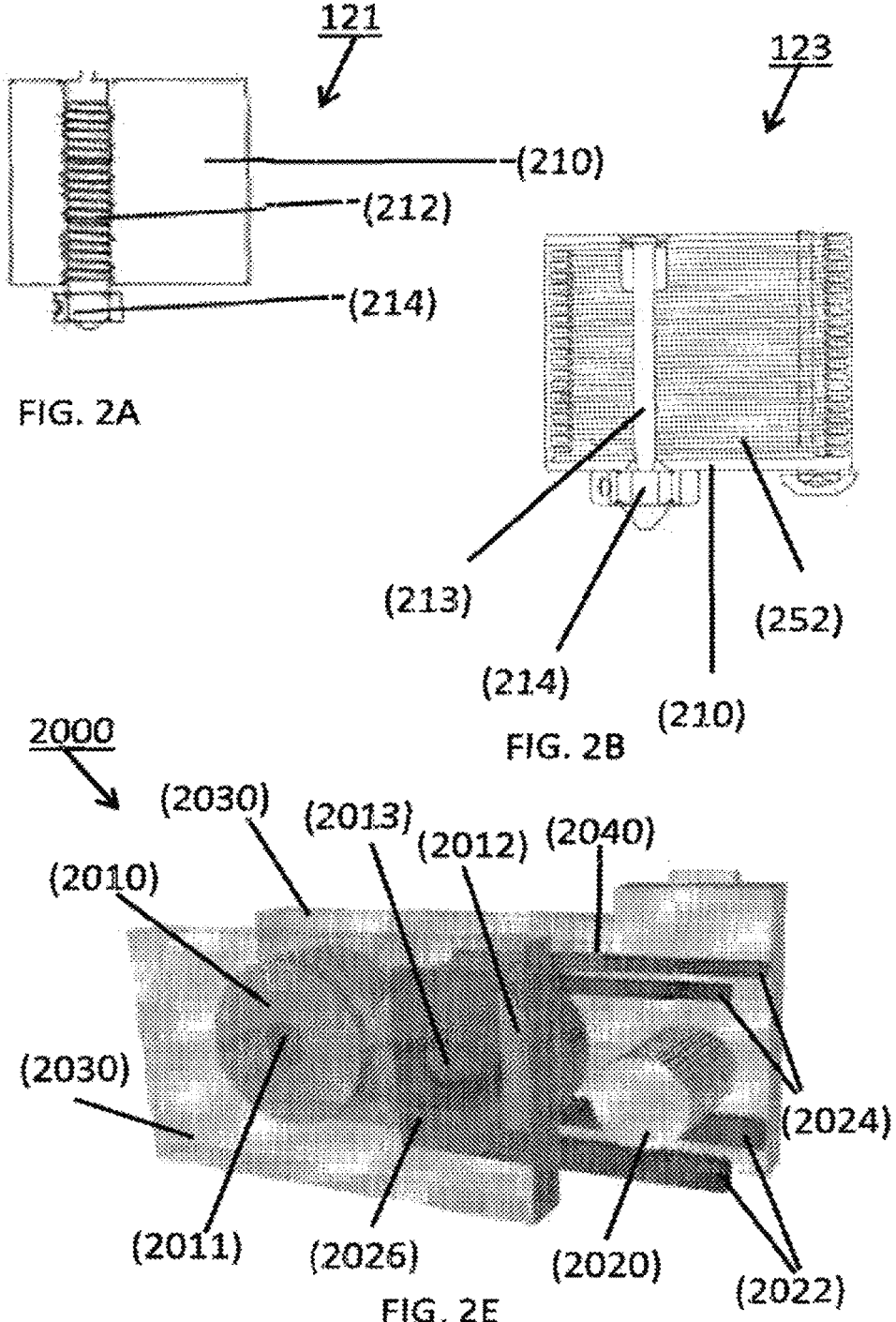
FIG. 2A is a transverse cross-section of a 3D printer print head according to some exemplary embodiments of the invention.
FIG. 2B is a transverse cross-section of a portion of a 3D printer print head according to additional exemplary embodiments of the invention.
FIG. 2E is a side perspective semi transparent view of a variable tensioning mechanism suitable for use with a pull motor according to some exemplary embodiments of the invention.

FIG. 2A is a transverse cross-section of a portion of an FDM 3D printer print head, indicated generally as 121 according to some exemplary embodiments of the invention.

Depicted exemplary 3D printer 100 includes a support framework 130 to which other components are attached, directly or indirectly.

Depicted exemplary 3D printer 100 also includes one or more feed mechanisms 112 which each include a push motor adapted to push a solid filament through a feed conduit 114 (dashed rectangle surrounding group of conduits) and a print head 122 comprising a pull motor adapted to pull the filament from conduit 114 and direct the filament to a heating block 210 (FIG. 2A) in fluid communication with a print nozzle 214. Heating block 210 is heated by an electric coil 212.

Feed mechanism 112 is a commercially available extruder sold for use in 3D printing with a modified connector 113. One example of an extruder suitable for use in this context is the "BONDTECH mini geared (BMG) 3d Extruder" (Bondtech AB, Sweden). Connector 113 is described hereinbelow in the context of FIG. 3A, FIG. 3B, and FIG. 3C. Exemplary filament materials are described hereinbelow.

In the depicted embodiment, controller 128 is configured to coordinately operate the push motor, the pull motor, and the print nozzle. In some exemplary embodiments of the invention, controller 128 also controls tension exerted on the filament by the pull motor.

In the depicted embodiment, printer 100 includes two or more feed mechanisms 112 (four are depicted) connected by a like number of conduits 114 to print head 122. In some embodiments, each feed mechanism 112 provides filament of a different color of material and/or a different material. According to various exemplary embodiments of the invention 2, 3, 4, 5, 6 or more filament feed mechanisms 112 are employed for a corresponding number of colors and/or materials.

Filaments from feed mechanisms 112 converge at a filament splitter attached to print head 122 as explained hereinbelow.

In the depicted embodiment, printer 100 includes a first support bar 110 upon which feed mechanism 112 is mounted and a second support bar 120 upon which print head 122 is mounted. According to various exemplary embodiments of the invention, a distance between the push motor of feed mechanism 112 and the pull motor of print head 122 is 25 cm, 30 cm, 35 cm, 40 cm, 45 cm, or intermediate or smaller distances. In some embodiments, first support bar 110 is vertically offset with respect to second support bar 120. In some embodiments, the distance contributes to a reduction in vibration from the push motor of feed mechanism 112 at print head 122. In some embodiments, this reduction in vibration contributes to an increase in printing accuracy. In some embodiments conduits 114 are built of flexible hose, so they dampen vibration.

Motion of the filament through conduits 114 produces friction which can cause uncoupling of connector 113 from feed mechanism 112. In some embodiments connector 113 of feed mechanism 112 comprises two or more push to fit connectors (e.g. Groove Mount Bowden Adaptors and/or Festo fittings) installed in series to lock an end of feed conduit 114 to an output port in feed mechanism 112. Alternatively or additionally, in some embodiments connector 113 of feed mechanism 112 comprises glue adhering an end of feed conduit 114 to an output port in feed mechanism 112.

FIG. 2E is a side perspective semi-transparent view of a variable tensioning mechanism, indicated generally as 2000 suitable for use with a pull motor of feed mechanism 122 according to some exemplary embodiments of the invention.

In some exemplary embodiments of the invention, use of a variable tensioning mechanism 2000 in the pull motor of feed mechanism 122 adjusts a pull force in accord with a filament being pulled at any given moment. Adjustment of pull force is useful, for example, if several different filament types are available to a splitter 220 as described hereinbelow. In some exemplary embodiments of the invention, variable tensioning mechanism 2000 is subject to control of controller 128 (FIG. 1) or a separate controller (not depicted). Controller 128 is an integrated controller performing other functions as described hereinabove. In some exemplary embodiments of the invention, a current sensor (not depicted) on the pull motor provides an output signal to the controller (e.g. 128) and the controller adjusts tensioning mechanism 2000 in response to the output signal received from the current sensor. Use of an output signal from a current sensor on an extruder motor is described in Tlegenov et al., (Progress in Additive Manufacturing (2019) 4:211-223) which is fully incorporated herein by reference.

Depicted exemplary variable tensioning mechanism 2000 includes a toothed drive gear 2010 powered by a drive shaft 2011 connected to a motor (not depicted) and a toothed tensioning gear 2012 which rotates freely about axle 2013. In the depicted embodiment, drive shaft 2011 passes through support walls 2030 so that drive gear 2010 is in a fixed position with respect to support walls 2030.

When a distance between drive shaft 2011 and axle 2013 decreases, tension on a filament being pulled though a space between gears 2010 and 2012 increases. Conversely, when a distance between drive shaft 2011 and axle 2013 increases, tension on a filament being pulled though a space between gears 2010 and 2012 decreases.

In the depicted embodiment, distance between drive shaft 2011 and axle 2013 is adjustable by rotation of toothed distance control gear 2020 which is powered by a motor (not depicted) subject to control of a controller (e.g. 128 in FIG. 1). Rotational motion of toothed distance control gear 2020 is translated to linear motion of drive rails 2022 via complementary teeth on rails 2022 that engage the teeth of gear 2020. Linear motion of rails 2022 moves support frame 2026 of axle 2013 relative to walls 2030. (Axle 2013 is engaged by frame 2026 but not by walls 2030) The movement of support frame 2026 moves axle 2013 and tensioning gear 2012 towards or away from drive gear 2010 depending on the direction of movement. In the depicted embodiment, guide rods 2024 pass though guide brackets 2040 (only one is visible in the figure) to help maintain a correct orientation of support frame 2026 with respect to support walls 2030.

There are commercially available variable tensioning mechanisms that can be incorporated into the context of a printer according to exemplary embodiments of the invention. Examples of such variable tensioning mechanisms include, but are not limited to LGX® Large Gears eXtruder and BMG® Extruder (both produced by Bondtech AB Sweden). These adjustable tension mechanisms are designed for manual adjustment, but an interface to a controller could easily be designed and implemented by a person of ordinary skill in the art relying on this specification for guidance.

Exemplary Filament Splitter

Figures 2C, 2D:
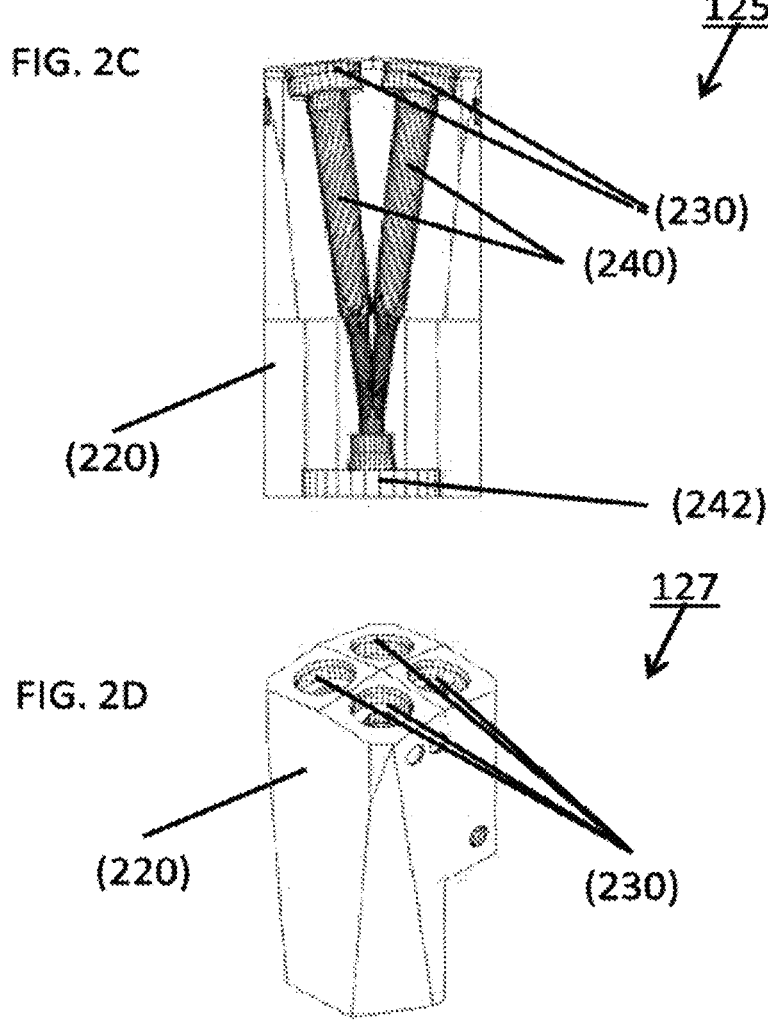
FIG. 2C is a transverse cross-section of filament splitter for use in conjunction with a 3D printer print head according to some exemplary embodiments of the invention.
FIG. 2D is a top perspective view of the filament splitter of FIG. 2C.

FIG. 2C is a transverse cross-section, indicated generally as 125, of a filament splitter for use in conjunction with a 3D printer print head according to some exemplary embodiments of the invention.

FIG. 2D is a top perspective view, indicated generally as 127, of the filament splitter of FIG. 2C.

Figures 3A, 3B, 3C:
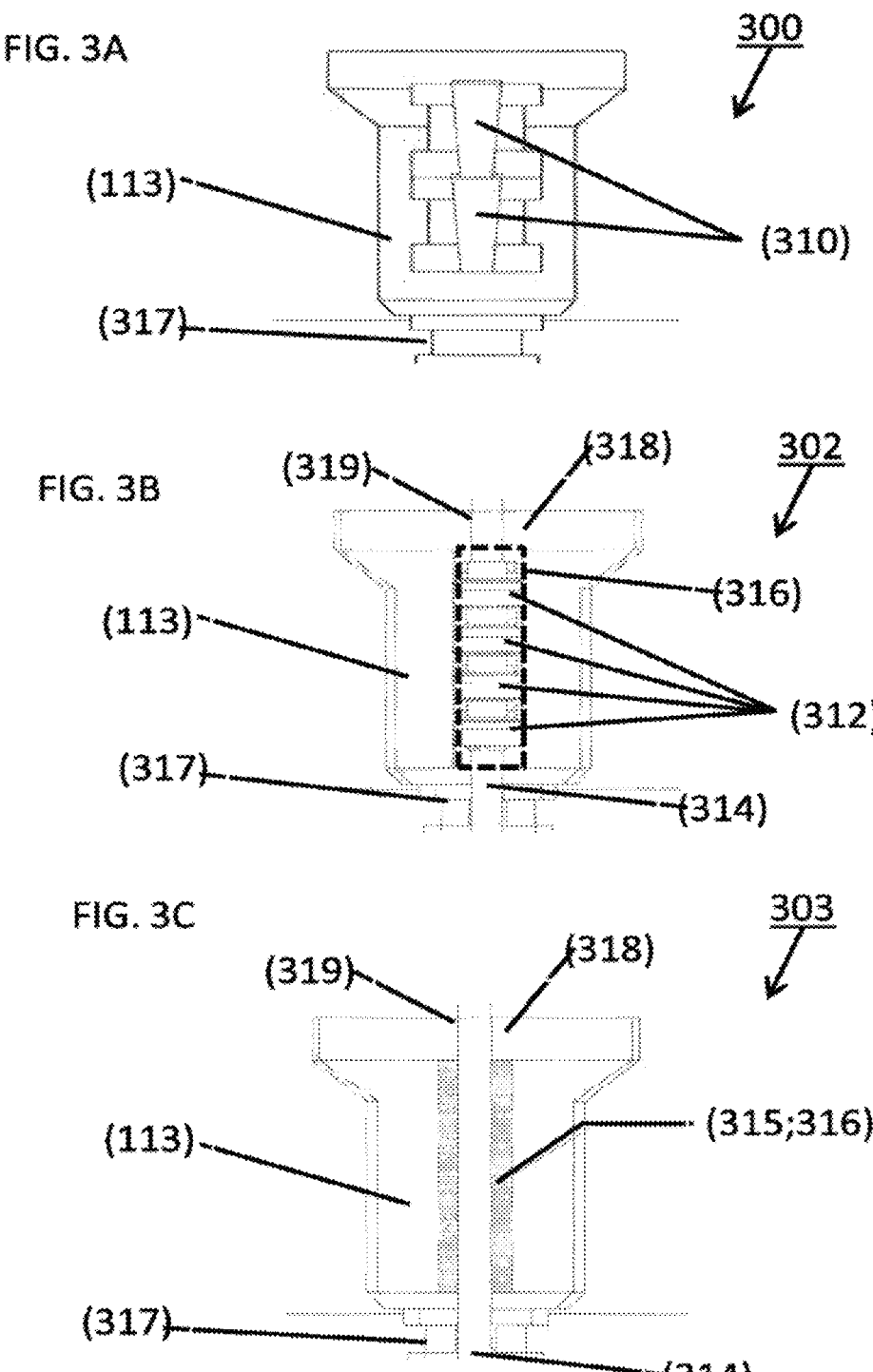
FIG. 3A is a transverse cross-section of a conduit coupler with 2 push to fit connectors according to some exemplary embodiments of the invention.
FIG. 3B is a transverse cross-section of a conduit coupler with 4 push to fit connectors according to some exemplary embodiments of the invention.
FIG. 3C is a transverse cross-section of a conduit coupler with glue according to some exemplary embodiments of the invention.

In FIGS. 2C and 2D, the splitter 220 includes a plurality of filament intake ports 230 (four ports 230 are depicted in FIG. 2D but the actual number varies with the number of feed mechanisms 112 associated with a single print head 122). In various exemplary embodiments of the invention 6, 8, 10 or 12 ports 230 are provided in splitter 220. In use, ports 230 are connected to individual feed conduits 114. In some embodiments, connection is with a connector assembly including one or more push to fit connector such as a Groove Mount Bowden Adaptors and/or Festo fittings. In some embodiments the push to fit connectors are used in series as described in the context of FIG. 3A; FIGS. 3B and 3C.

Ports 230 are in fluid communication with filament guides 240 which converge at print head connector 240 (FIG. 2C). Connector 242 is configured for attachment to a print head 122. Exemplary attachment configurations for connector 242 and print head 122 include screw threads, twist lock and snap to fit.

When a splitter 220 is installed on a print head 122, the type of filament delivered by the print head at any given moment is governed by which feed mechanism 112 is operated by controller 128 at that moment.

One example of a commercially available splicer suitable for use in various exemplary embodiments of the invention is an M2P1 Hotend 24V splicer (manufactured by XIAOMINDIAN-HAT). Other splicers are commercially available and can easily be substituted.

Additional Exemplary Printer

Referring still to FIG. 1, in some embodiments printer 100 includes a first support bar 110 upon which one or more feed mechanism(s) 112 is mounted. In the depicted embodiment, first support bar is operably connected to a first drive train 111 (indicated symbolically as double-headed arrow) configured to provide linear motion in 1 axis in 2 directions. In the depicted embodiment, printer 100 includes a second support bar 120 upon which a print head 122 is mounted. In some embodiments second support bar 120 is operably connected to a second drive train 123 (indicated symbolically as double-headed arrow) configured to provide linear motion in 1 axis, parallel to the one axis of first drive 111, in 2 directions and a third drive train 125 (indicated symbolically as double-headed arrow) configured to provide parallel linear motion of print head 122 relative to second bar 120 in 2 directions.

In the depicted embodiment, controller 128 is configured to coordinately operate first drive train 111, second drive train 123, and third drive train 125. In some embodiments, coordinate operation ensures that a distance between print head 122 and each of feed mechanisms 112 does not exceed a length of a relevant conduit 114. This coordinate operation is in addition to the main function of controller 128 which is to direct print head 122 in depositing drops of filament to print a 3D object specified by a G code file or other print specification file.

In some embodiments printer 100 includes a fourth drive train 115 (indicated symbolically as double-headed arrow) configured to provide parallel linear motion of the one or more feed mechanism(s) 112 relative to first bar 110 in 2 directions. According to these embodiments controller 128 is configured to coordinately operate first drive train 111, second drive train 123, third drive train 125, and fourth drive train 115. Coordinate operation is as described above.

In the depicted embodiment, printer 100 includes two or more feed mechanisms 112 (4 are depicted) connected by a like number of conduits 114 to print head 122. In some embodiments each feed mechanism provides a different color of filament and/or filament of different material. According to various exemplary embodiments of the invention 2, 3, 4, 5, 6 or more feed mechanisms 112 are employed for a corresponding number of different colors and/or different materials. In some embodiments controller 128 operates a single feed mechanism 112 at a time in accord with a specified color and/or material in a program file of an object being printed. In some embodiments feed mechanism 112 employs two or more push to fit connectors (e.g. Groove Mount Bowden Adaptors and/or Festo fittings) installed in series to lock an end of feed conduit 114 to an output port in the feed mechanism. (See FIG. 3A and FIG. 3B and accompanying description). In some embodiments feed mechanism 112 employs glue to lock an end of feed conduit 114 to an output port in the feed mechanism. (See FIG. 3C and accompanying description).

Exemplary drive trains suitable for use in the context of 111, 123, 115, and 125 are described in the following section.

Exemplary Drive Trains

Figures 4A, 4B:
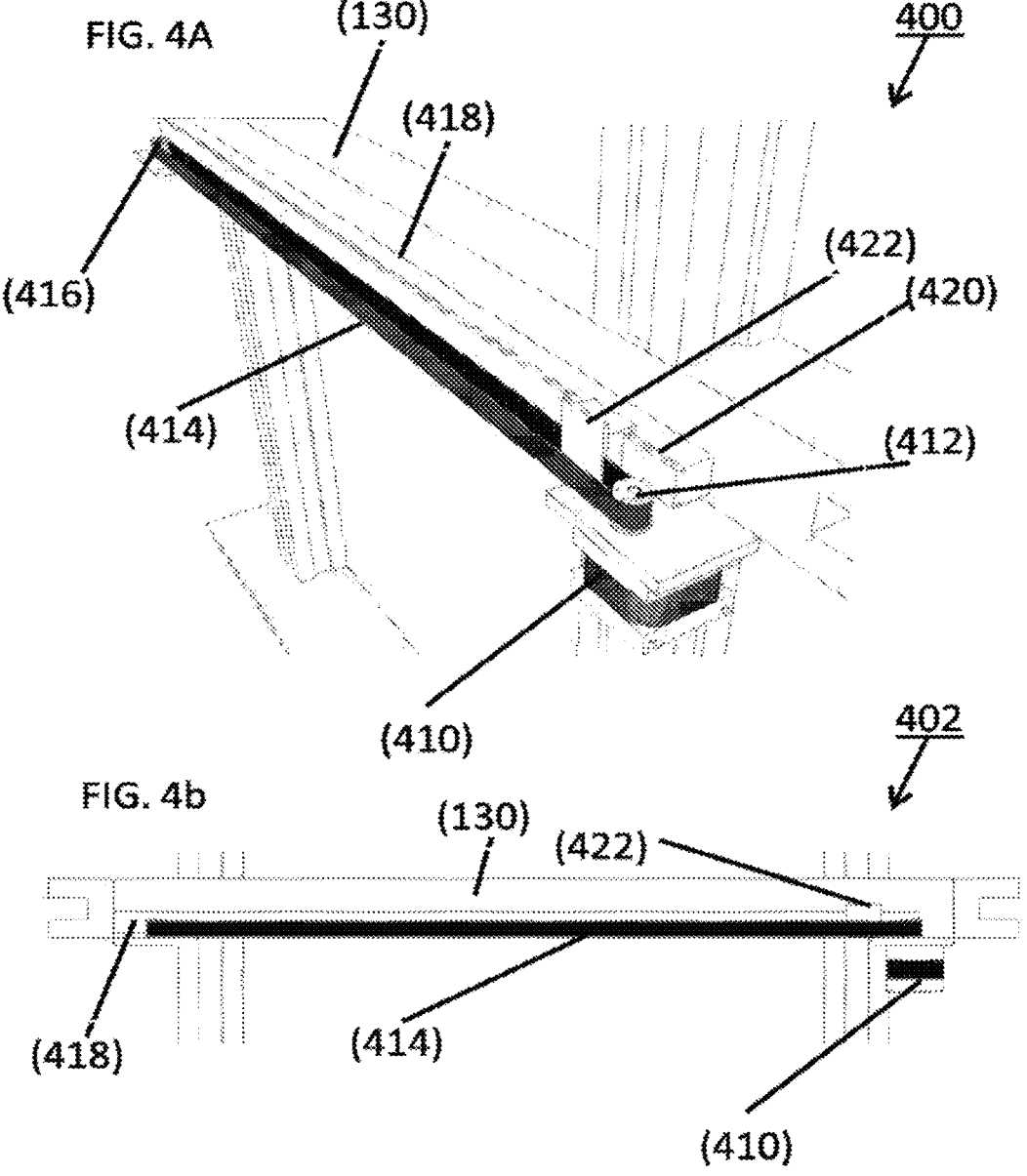
FIG. 4A is a perspective view of a belt drive train suitable for use in various exemplary embodiments of the invention.
FIG. 4B is a front view of the drive train of FIG. 4A.

FIG. 4A is a perspective view of a belt drive train, indicated generally as 400 suitable for use in various exemplary embodiments of the invention. FIG. 4B is a front view, indicated generally as 402, of the drive train of FIG. 4A. In the depicted embodiment, a motor 410 turns an active axle 412. Friction between axle 412 and a looped belt 414 causes rotation of belt 414 about active axle 412 and passive axle 416. A guide plate 422 is fixedly attached to belt 415 so that the plate moves along guide notch 420 in plate support bar 418 as the belt rotates. When a direction of rotation of active axle 412 is reversed, a direction of travel of plate 422 is reversed. According to various exemplary embodiments of the invention, a guide plate 422 is attached to 110 and/or 120 and/or 122 and/or 112. In some embodiments, a passive guide mechanism featuring only a guide plate 422 and support bar 418 operates in parallel (e.g. at an opposite end of 110 and/or 120). In other exemplary embodiments of the invention, the drive mechanism in its entirety is duplicated at an opposite end of 110 and/or 120. Alternatively or additionally, in some embodiments bearings in guide notch 420 contribute to a reduction in friction between guide plate 422 and support bar 418. Support framework 130 is analogous to support framework 130 in FIG. 1.

Figures 4C, 4D:
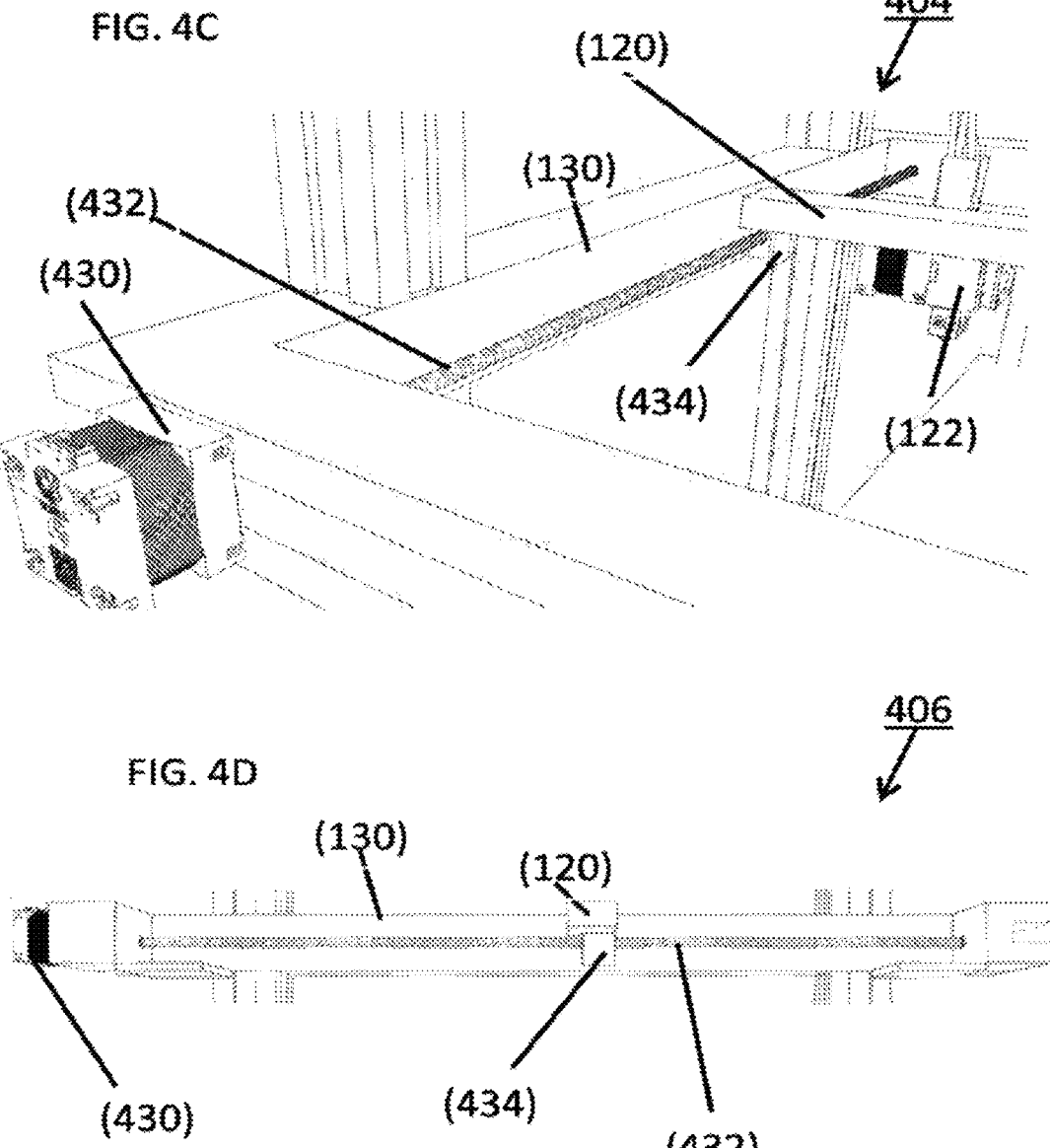
FIG. 4C is a perspective view of a ball screw drive train suitable for use in various exemplary embodiments of the invention.
FIG. 4D is a front view of the drive train of FIG. 4C.

FIG. 4C is a perspective view of a ball screw drive train suitable, indicated generally as 404, suitable for use in various exemplary embodiments of the invention. FIG. 4D is a front view, indicated generally as 406, of the drive train of FIG. 4C. In the depicted embodiment, a motor 430 turns a ball screw t 432 which passes through a ball nut 434 mounted under a structure to be moved (second support bar 120 in FIG. 4C). Rotation of ball screw 432 in one direction causes ball nut 432 to move away from motor 430 and rotation of ball screw 432 in an opposite direction causes ball nut 432 to move towards motor 430. According to various exemplary embodiments of the invention ball nut 432 is attached to 110 and/or 120 and/or 122 and/or 112. In some embodiments, a passive guide mechanism operates in parallel (e.g. at an opposite end of 110 and/or 120). In other exemplary embodiments of the invention, the drive mechanism in its entirety is duplicated at an opposite end of 110 and/or 120. Support framework 130 is analogous to support framework 130 in FIG. 1.

Exemplary Method

FIG. 5A is a simplified flow diagram of a method which contributes to an increase in speed of a 3D printing operation, indicated generally as 500, according to some exemplary embodiments of the invention.

Depicted exemplary method 500 includes computing 510, using a data processor, a shortest travel path for all points of a single color in one or more layers of a 3D object described by a G code file. In the depicted embodiment, method 500 includes transmitting the shortest travel path output by the data processor to a controller of a 3D printer (e.g. 128 in FIG. 1) and printing 530 all points of the single color in the one or more layers of the 3D object described by a G code file using said 3D printer. In some embodiments computing 510 relates to a single layer. In some embodiments computing 510 relates to a group of two or more layers.

In the depicted embodiment, method 500 includes repeating 510, 520, and 530 for an additional single color until all colors in the one or more layers have been printed.

In the depicted embodiment, method 500 includes repeating 510, 520, 530, and 540 for an additional one or more layers until all colors in all layers of the 3D object have been printed. In some embodiments, method 500 includes doubling the number of layers for the last color so that the last color becomes the first color repeated at 550.

For a printing operation with N colors, with each color being printed in X layers at a time:

In the first round, each of colors 1 to (N-1) is printed in X layers at a time;

Color N is printed in 2X layers, with the last X of those layers serving as the first step (510) in the second round.

As the second round continues, each of colors 1 to (N-2) is printed in X layers at a time;

Color (N-2) is printed in 2X layers, with the last X of those layers serving as the first step 510 in the third round.

Figure 5B:
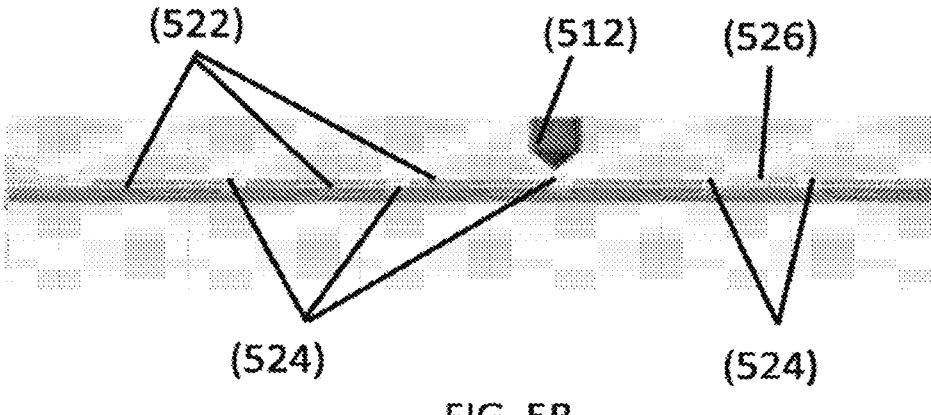
FIG. 5B is a schematic representation of a print head printing a multicolor object according to some exemplary embodiments of the invention.

FIG. 5B is a schematic representation of a print head 512 printing a multicolor object according to some exemplary embodiments of the invention. In the depicted embodiment, nozzle 512 prints two or more layers with material 524 and/or 526 and then returns to print with 522. Determination of how many layers will be printed sequentially from a specific material considers nozzle geometry of print head 512 and the ability of the nozzle to descend without damaging previously printed portions of the object. In some exemplary embodiments of the invention, nozzle 512 prints up to 3 layers at a time for a specific filament type/color. In some embodiments, mechanical modification of the nozzle geometry contributes to an ability to print more than 3 layers at a time for a specific filament type/color.

Exemplary Inductive Heating Embodiment

FIG. 2B is a transverse cross-section of a portion of a 3D printer print head, indicated generally as 123, according to additional exemplary embodiments of the invention.

In the depicted embodiment, 123 is a portion of an FDM (fused deposition modeling) printing head comprising an inductive heater 252 to melt material in loading tube 213 so that it can pass through a print nozzle 214. In some embodiments, inductive heater 252 heats block 210 and/or tube 213. In some exemplary embodiments of the invention, inductive heater 252 heats material in tube 213 directly. In some embodiments material metal ions in a filament in tube 213 contribute to an increase in efficiency of direct inductive heating. In some exemplary embodiments of the invention, colored thermoplastic polymer filaments containing metal ions in their dye are subject to inductive heating. In other exemplary embodiments of the invention, metal filaments are used for printing.

Additional Exemplary Method

Figure 6:
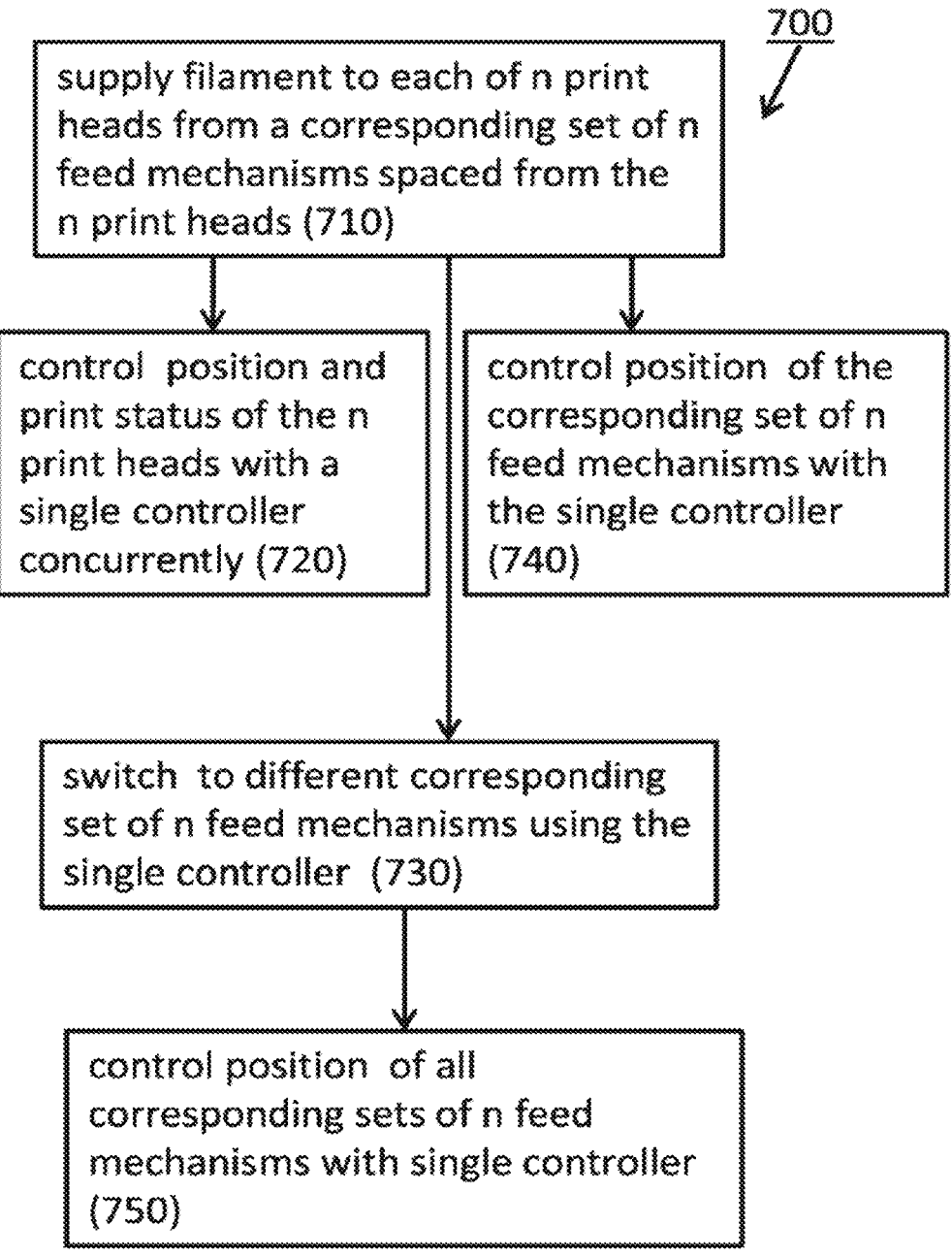
FIG. 6 is a simplified flow diagram of a method according to some exemplary embodiments of the invention.

FIG. 6 is a simplified flow diagram of a method, indicated generally as 700, for parallel printing of identical objects according to some exemplary embodiments of the invention.

Depicted exemplary method 700 includes supplying 710 filament to each of n print heads from a corresponding set of n feed mechanisms spaced from said n print heads by at least 10 cm and controlling 720 position and print status of said n print heads with a single controller that provides parallel instructions to each of the n print heads concurrently.

In some embodiments, a controller operates one or more drive trains to which the n print heads are attached. As a result, each print head prints an identical item in parallel. According to various exemplary embodiments of the invention, each set of n feed mechanisms includes 2, 3, 4, 5, 6, 7, or 8 or more feed mechanisms with each feed mechanism in a set loaded with a different filament type and/or filament color.

In the depicted embodiment, method 700 includes switching 730 to a different corresponding set of n feed mechanisms using the single controller. In some embodiments, each set of feed mechanisms is loaded with different filament (e.g. different color and/or different material).

In the depicted embodiment, method 700 includes controlling 740 position of the corresponding set of n feed mechanisms with the single controller that provides parallel instructions to each of the n feed mechanisms concurrently. In some embodiments, this keeps a distance between print head and feed mechanism in a desired range (i.e. less than a length of conduit connecting feed mechanisms to print heads).

In the depicted embodiment, method 700 includes controlling 750 position of all corresponding sets of n feed mechanisms with the single controller that provides parallel instructions to each of the n feed mechanisms in all of the sets concurrently. (i.e. keeping position of feed mechanisms close enough to print head so distance is less than a length of conduit connecting feed mechanisms to print heads).

Exemplary Parallel Printing System

Figure 7:
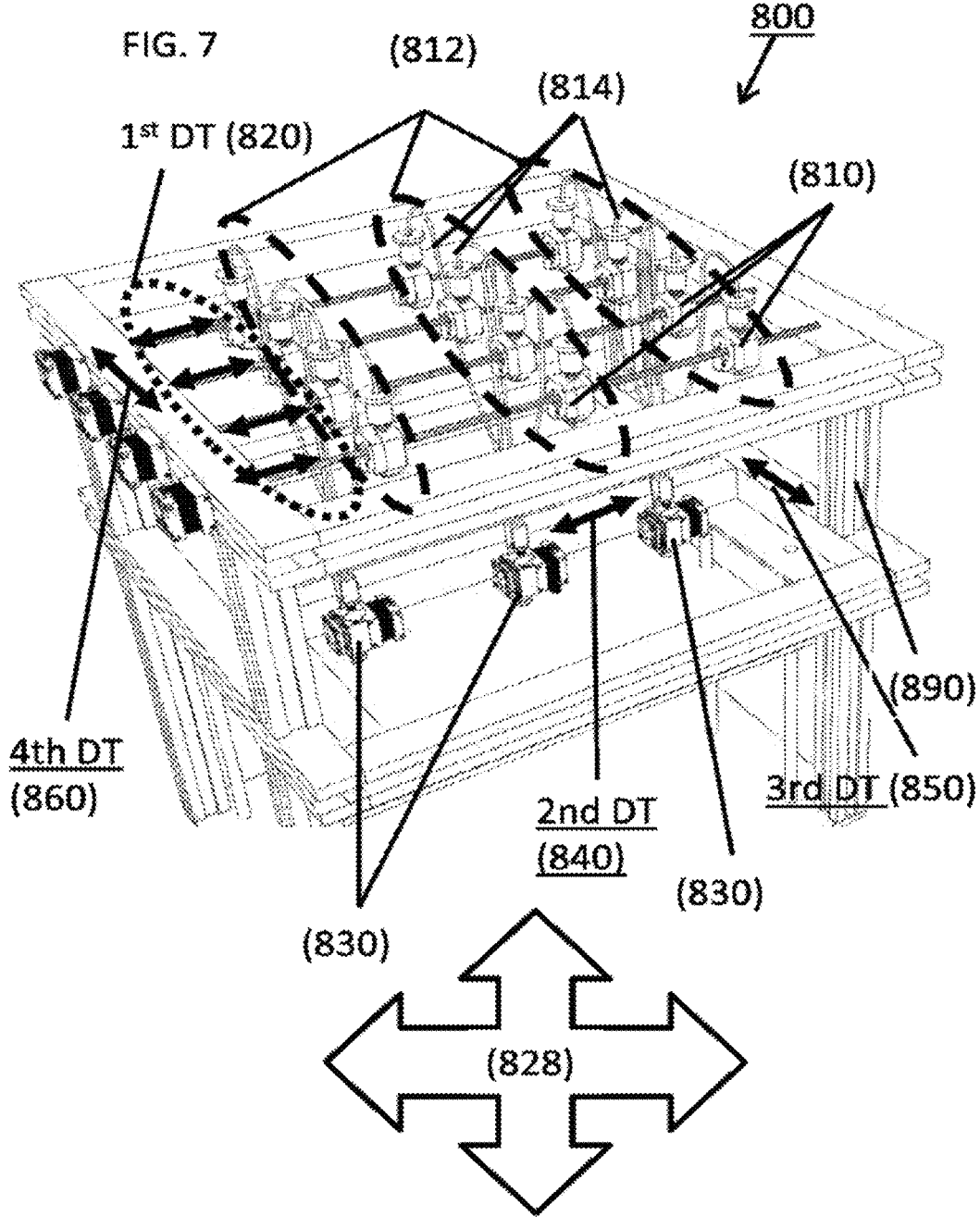
FIG. 7 is a schematic top perspective view of a system according to some exemplary embodiments of the invention.

FIG. 7 is a schematic top perspective view of a parallel printing system, indicated generally as 800, according to some exemplary embodiments of the invention.

Depicted exemplary parallel 3D printing system 800 includes at least X sets 812 (dashed ovals) of n filament feed mechanisms 810 operably connected to a first drive train 820 (represented symbolically by a series of double-headed arrow; surrounded by a dotted oval) configured to provide linear motion in 1 axis in 2directions and X print heads 830 operably connected to a second drive train 840 (represented symbolically by a double-headed arrow) configured to provide linear motion in 1 axis, parallel to the one axis of first drive 820, train in 2 directions and a third drive train 850 (represented symbolically by a double-headed arrow) configured to provide linear motion of the X print heads 830 in a perpendicular axis in 2 directions. In the depicted embodiment, X=3 and n=4. In the depicted embodiment, feed mechanisms 810 are connected to print heads 830 by conduits 814. According to various exemplary embodiments of the invention n≥2; n≥3; n≥4; n≥5; n≥6; n≥7 or n≥8 or larger integers.

In the depicted embodiment, system 800 includes a controller 828 configured to coordinately operate first drive train 820, second drive train 840 and third drive train 850. Coordinate operation is as described hereinabove. In some embodiments system 800 includes a fourth drive train 860 (represented symbolically by a double-headed arrow) configured to provide linear motion of said X sets of n feed mechanisms in a perpendicular axis in 2 directions. According to these embodiments, controller 828 is configured to coordinately operate first drive train 820, second drive train 840, third drive train 850 and fourth drive train 860.

In some embodiments each feed mechanism 810 within a set 812 provides a different color of material and/or type of material. According to various exemplary embodiments of the invention n=1, 2, 3, 4, 5, 6 or more for a corresponding number of colors and/or material types.

Alternatively or additionally, in some embodiments controller 838 is configured to operate a single filament feed mechanism in each of said X sets at a time in accord with a specified color and/or material in a program file of an object being printed.

Alternatively or additionally, in some embodiments each filament feed mechanism 810 employs two or more push to fit connectors in series to lock an end of feed conduit 814 to an output port in feed mechanism 810. In some embodiments the push to fit connectors are Groove Mount Bowden Adaptors and/or Festo fittings. See FIG. 3A and 3B and accompanying description for details.

Fourth Exemplary Method

Figure 8:
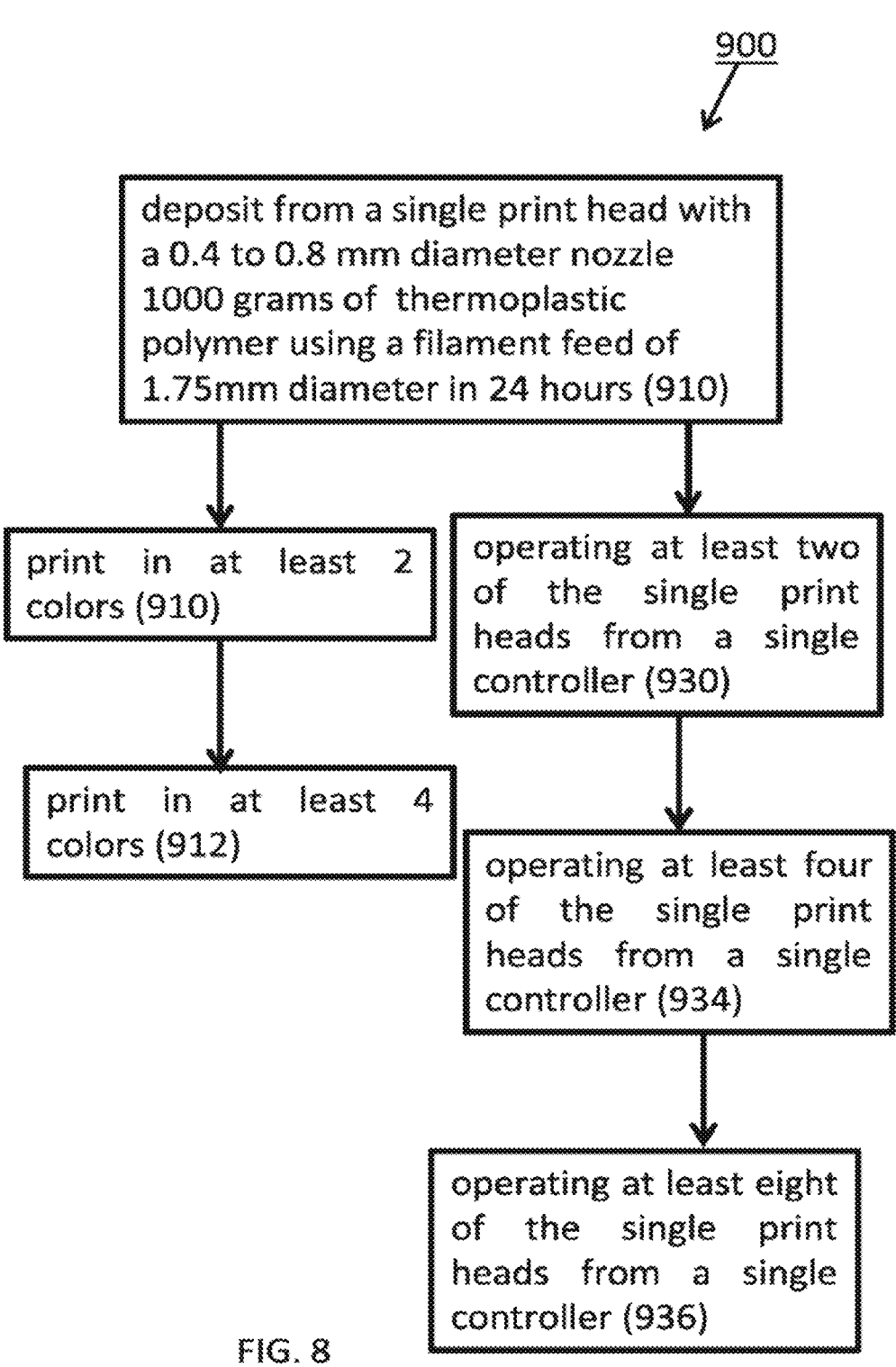
FIG. 8 is a simplified flow diagram of a method according to some exemplary embodiments of the invention.

FIG. 8 is a simplified flow diagram of a high output 3D printing method, indicated generally as 900, according to some exemplary embodiments of the invention.

Depicted exemplary FDM printing method 900 includes depositing 910 from a single print head with a 0.4 to 0.8 mm diameter nozzle 1000 grams of thermoplastic polymer using a filament feed of 1.75 mm diameter in 24 hours. According to various exemplary embodiments of the invention, the amount of deposited material is 1100 grams, 1200 grams, 1300 grams, 1400 grams, 1500 grams, 1600 grams, 1700 grams, 1800 grams, 1900 grams, 2000 grams, 2100 grams, 2200 grams, 2300 grams, 2400 grams, 2500 grams, 2600 grams, 2700 grams, 2800 grams, 2900 grams, 3000 grams or intermediate or greater amounts. In some embodiments method 900 includes printing 910 in at least 2 colors and/or printing 912 in at least 4 colors. Alternatively or additionally, in some embodiments method 900 includes and/or operating 930 at least two of said single print heads from a single controller and/or operating 934 at least four of said single print heads from a single controller and/or operating 936 at least eight of said single print heads from a single controller.

Various production parameters described hereinabove including shortest travel path (see FIG. 5 and description), motor on print head (see FIG. 1 and accompanying description), inductive heating (See FIG. 2B and accompanying description and use of parallel axes (see FIG. 1 and accompanying description), to reduce vibration and/or increases accuracy each contribute to the high output rate.

Exemplary Connector Assemblies

FIG. 3A is a transverse cross-section of a conduit coupler with 2 push to fit connectors, indicated generally as 300 according to some exemplary embodiments of the invention.

FIG. 3B is a transverse cross-section of a conduit coupler with 4 push to fit connectors, indicated generally as 302, according to some exemplary embodiments of the invention.

Some exemplary embodiments of the invention relate to a connector assembly (e.g. 300 or 302) including a cowling 113 with an internal cavity 316 a conduit 314 passing through cavity 316. And at least 2 push to fit connectors 310; 312 serially engaging a portion of conduit 314 and contacting an inner wall of cavity 316. In the depicted embodiment, cowling 113 has a conduit sized hole 319 in its top surface 318.

In some embodiments use of 2, 3, 4, or more push to fit connectors arranged in series fastens conduit 314 to output port 317 with sufficient force to offset friction of filament moving through conduit 314.

FIG. 3C is a transverse cross-section of a conduit coupler with glue indicated generally as 303, according to some exemplary embodiments of the invention.

Some exemplary embodiments of the invention relate to a connector assembly 303 including a cowling 113 with an internal cavity 316 filled with glue 315 and a conduit 314 passing through cavity 316. In the depicted embodiment, cowling 113 has a conduit sized hole 319 in its top surface 318.

In some embodiments use glue 315 fastens conduit 314 to output port 317 with sufficient force to offset friction of filament moving through conduit 314.

Exemplary Filament Materials

For purposes of this specification and the accompanying claims, the term "filament" includes thermoplastic polymers and/or metals. Thermoplastic polymers include but are not limited to PP and/or PS and/or PEKK and/or PLA and/or PEEK and/or PPS and/or PA6 and/or PA12 and/or PC and/or TPU and/or TPE and/or ABS and/or ASA and/or PET-G and/or combinations thereof. Metals include but are not limited to copper and/or aluminum and/or lead and/or tin and/or gold and/or platinum and/or titanium and/or stainless steel and/or alloys thereof.

Exemplary Vertical Displacement Mechanisms

Figure 9:
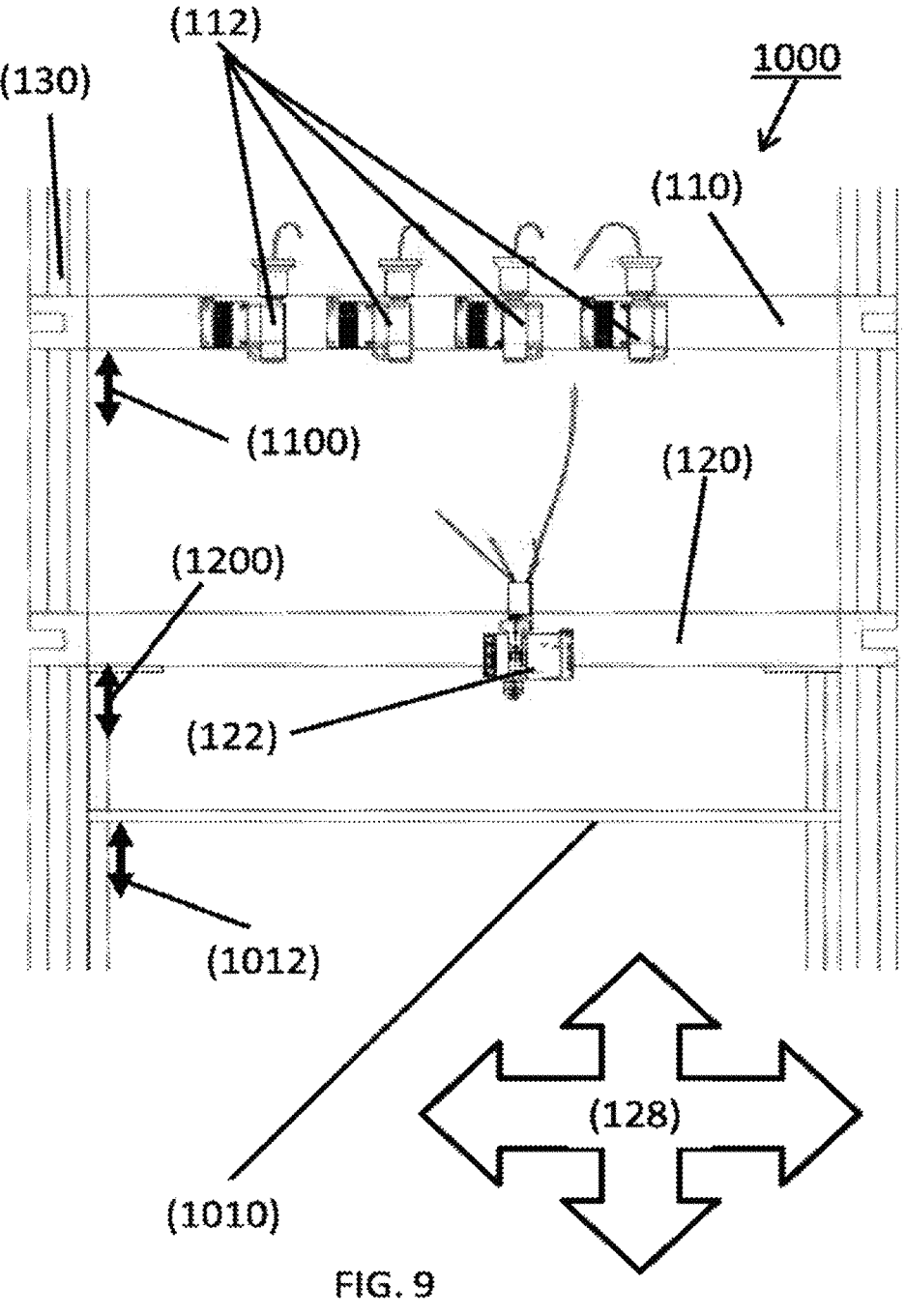
FIG. 9 is a schematic front view of a system according to some exemplary embodiments of the invention.

FIG. 9 is a schematic front view of a 3D printing system, indicated generally as 1000, according to some exemplary embodiments of the invention. The features described in the context of this figure supplement features described in the context of FIG. 1 and/or FIG. 6C and/or FIG. 8 and can be implemented in the context of system 100 and/or 602 and/or 800.

As in the previous figures, 130 indicates a support framework, 112 indicates feed mechanisms on first support bar 110, and 122 indicates a print head on second support bar 120. The controller is indicated as 128 but represents also 670 and/or 828.

In some embodiments, system 1000 includes a vertical displacement mechanism 1012 (represented symbolically as a double-headed arrow) for object stage 1010. According to these embodiments, as the object being printed by print head 122 grows in height, mechanism 1012 lowers stage 1010 to facilitate additional printing. Mechanism 1012 is coordinately controlled by controller 128. Coordinate control is as described hereinabove.

In some embodiments, system 1000 includes a vertical displacement mechanisms 1100 and 1200 (represented symbolically as double-headed arrows) for support bars 110 and 120 respectively. According to these embodiments, as the object being printed by print head 122 grows in height, displacement mechanisms 1100 and 1200 raise support bars 110 and 120 respectively to facilitate additional printing. Mechanisms 1012 are 1100 and 1200 coordinately controlled by controller 128. Coordinate control is as described hereinabove.

According to various exemplary embodiments of the invention, vertical displacement mechanisms 1012 and/or 1100 and/or 1200 comprise belt drive-drive trains (see FIGS. 4A and 4B and accompanying description) and/or ball screw drive trains (see FIGS. 4C and 4D and accompanying description) and/or hydraulic lift mechanisms.

It is expected that during the life of this patent many filament materials, print head types, and drive train types will be developed and the scope of the invention is intended to include all such new technologies a priori.

Although the invention has been described in conjunction with specific embodiments thereof, it is evident that many alternatives, modifications, and variations will be apparent to those skilled in the art. Accordingly, it is intended to embrace all such alternatives, modifications, and variations that fall within the spirit and broad scope of the appended claims.

Specifically, a variety of numerical indicators have been utilized. It should be understood that these numerical indicators could vary even further based upon a variety of engineering principles, materials, intended use, and designs incorporated into the various embodiments of the invention. Additionally, components and/or actions ascribed to exemplary embodiments of the invention and depicted as a single unit may be divided into subunits. Conversely, components and/or actions ascribed to exemplary embodiments of the invention and depicted as sub-units/individual actions may be combined into a single unit/action with the described/depicted function.

Alternatively, or additionally, features used to describe a method can be used to characterize an apparatus, and features used to describe an apparatus can be used to characterize a method.

It should be further understood that the individual features described hereinabove can be combined in all possible combinations and sub-combinations to produce additional embodiments of the invention. The examples given above are exemplary in nature and are not intended to limit the scope of the invention which is defined solely by the following claims.

Each recitation of an embodiment of the invention that includes a specific feature, part, component, module, or process is an explicit statement that additional embodiments of the invention not including the recited feature, part, component, module, or process exist.

Alternatively or additionally, various exemplary embodiments of the invention exclude any specific feature, part, component, module, process or element which is not specifically disclosed herein.

Specifically, embodiments of the invention have been described in the context of FDM printing but might be used in other additive manufacturing protocols as well.

All publications, references, patents, and patent applications mentioned in this specification are herein incorporated in their entirety by reference into the specification, to the same extent as if each individual publication, patent, or patent application was specifically and individually indicated to be incorporated herein by reference. In addition, citation or identification of any reference in this application shall not be construed as an admission that such reference is available as prior art to the present invention.

The terms "include", and "have" and their conjugates as used herein mean "including but not necessarily limited to".

The invention claimed is:

1. A 3D printer comprising:
(a) a plurality of feed mechanisms, each comprising a push motor adapted to push a solid filament through a feed conduit;
(b) a filament splitter, comprising:
a plurality of filament intake ports, each adapted to receive a said solid filament from a said feed conduit;
a plurality of filament guides, each in connection with a said filament intake port;
a print head connector, at which said plurality of filament guides converge, configured to deliver a selectable single one of said plurality of solid filaments; and
(c) a print head comprising a pull motor adapted to pull said selected single solid filament from said print head connector and direct said single solid filament to a heating block in fluid communication with a print nozzle;
(d) a variable tensioning mechanism, configured to adjust a pull force of said single solid filament;
(e) a controller configured to coordinately operate each said push motor, said pull motor, said print nozzle, and said variable tensioning mechanism; and
(f) a current sensor, on said pull motor, configured to provide an output signal to said controller, whereby the controller adjusts the tensioning mechanism in response to the output signal.

2. A 3D printer according to claim 1, comprising:
a first support bar upon which said feed mechanisms are mounted; and
a second support bar upon which said print head is mounted.

3. A 3D printer according to claim 1, wherein at least one of said feed mechanisms comprises two or more push to fit connectors installed in series to lock an end of said feed conduit to an output port in said feed mechanism.

4. A 3D printer according to claim 1, wherein said plurality of solid filaments comprise filaments of different colors, filaments of different materials, or any combination thereof.

5. A 3D printer comprising:
(a) a first support bar, upon which one or more feed mechanisms is mounted, operably connected to a first drive train configured to provide linear motion to said one or more feed mechanisms along a single axis in 2 directions;
(b) a second support bar, upon which a print head is mounted, operably connected to a second drive train configured to provide linear motion to said print head along a single axis, parallel to said one axis of said first drive train in 2 directions;
(c) a third drive train configured to provide parallel linear motion of said print head relative to said second bar in 2 directions;
(d) one or more feed conduits connecting said one or more feed mechanisms to said print head; and
(e) a controller to operate said first drive train, said second drive train and said third drive train,
wherein said controller is configured to control said first drive train to distance said one or more feed mechanisms from said print head so as not to exceed the lengths of said one or more conduits between said one or more feed mechanisms and said print head, during operative motion of said print head by said second drive train.

6. A 3D printer according to claim 5, comprising two or more feed mechanisms connected by a like number of conduits to said print head.

7. A 3D printer according to claim 5, comprising a controller configured to coordinately operate said first drive train, said second drive train and said third drive train.

8. A 3D printer according to claim 5, comprising a fourth drive train configured to provide parallel linear motion of said one or more feed mechanism(s) relative to said first support bar in 2 directions.

9. A 3D printer according to claim 6, wherein said controller is configured to operate a single feed mechanism at a time in accord with a specified color in a program file of an object being printed.

10. A 3D printer according to claim 8, wherein said controller is configured to coordinately operate said first drive train, said second drive train, said third drive train and said fourth drive train.

* * * * *